United States Patent Office 3,652,554
Patented Mar. 28, 1972

3,652,554
HALOGEN-PREGNADIENES
Georg Anner, Ludwig Ehmann, and Jaroslav Kalvoda, Basel, Switzerland, assignors to Ciba Corporation, Summit, N.J.
No Drawing. Filed Nov. 15, 1968, Ser. No. 776,270
Claims priority, application Switzerland, Nov. 17, 1967, 16,101/67
Int. Cl. C07c *169/28*
U.S. Cl. 260—239.55          12 Claims

ABSTRACT OF THE DISCLOSURE

Compounds of the formula

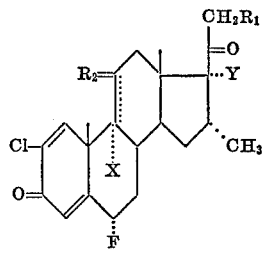

wherein
$R_1$=free, esterified or etherified hydroxyl

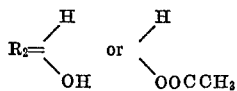

X=H or F; or
$R_2$+X represents a 9,11-double bond or a 9β,11β-oxido group and
Y=H, free or esterified hydroxyl
for example Δ$^{1,4}$-2-chloro-6α,9α-difluoro-16α-methyl-3,20-dioxo-11β,17α-dihydroxy-21-acetoxypregnadiene.

Use: as corticoid analgous and antiphlogistics.

BACKGROUND OF THE INVENTION

The present invention provides new steroids of the pregnane series which are substituted by chlorine in position 2, corresponding to the Formula I

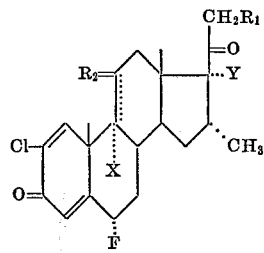

in which $R_1$ represents a free, esterified or etherified hydroxyl group, $R_2$ the group

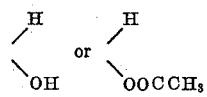

group, X a hydrogen or fluorine atom or $R_2$+X represents a 9,11-double bond or a 9β,11β-oxido group and Y represents a hydrogen atom or a free esterified hydroxyl group.

The above-mentioned esterified hydroxyl groups are primarily derived from organic carboxylic acids of the aliphatic, alicyclic, aromatic or heterocyclic series, especially those which contain 1 to 18 carbon atoms, for example formic, acetic, propionic, acid, butyric acids, valeric acids such as n-valeric acid, or trimethylacetic or trifluoroacetic acid, a caproic acid such as β-trimethylpropionic acid or diethylacetic acid, oenanthic, caprylic, pelargonic, capric, an undecyclic acid, for example undecylenic acid, lauric, myrstic, palmitic or stearic acids, for example oleic, cyclopropane-, cyclobutane-, cyclopentane- or cyclohexane-carboxylic acid, cyclopropylmethanecarboxylic, cyclobutylmethanecarboxylic, cyclopentylethanecarboxylic, cyclohexylethanecarboxylic, a cyclopentyl-, cyclohexyl- or phenyl-acetic or propionic acid, benzoic, phenoxyalkanoic acids such as phenoxyacetic, dicarboxylic acids such as succinic, phthalic, quinolic acid, furan-2-carboxylic, 5-tertiary butyl-furan-2-carboxylic, 5-bromo-furan-2-carboxylic acid, nicotinic or isonicotinic acid, or sulphonic acids such as benzenesulphonic acids or inorganic acids, for example phosphoric or sulphuric acids.

The ester groups may alternatively be derived from orthocarboxylic acids such as orthoformic, orthoacetic or orthopropionic acid, and these acids, as well as the above-mentioned dicarboxylic acids, may furnish cyclic 17,21-esters.

As etherified hydroxyl groups there may be specially mentioned those derived from alcohols with 1 to 8 carbon atoms, such as lower aliphatic alkanols, ethanol, methanol, propanol, isopropanol, the butyl or amyl alcohols, or from araliphatic alcohols, especially from monocyclic aryl-lower aliphatic alcohols, such as benzyl alcohol, or from heterocyclic alcohols, such as α-tetrahydropyranol or -furanol.

The new compounds of the above Formula I possess valuable pharmacological properties, inter alia apart from a thymolytic effect and an inhibiting effect upon the suprarenals especially an antiphlogistic effect as can be shown in animal tests, for example on rats, by the test for foreign bodies in a granuloma. The new compounds may therefore be used as corticosteroid analogues, especially as antiphlogistics. The new compounds are also valuable intermediates for the manufacture of other useful substances, especially compounds that display a pharmacological activity.

Special mention deserves Δ$^{1,4}$-2-chloro-6α,9α-difluoro-16α - methyl - 3,20 - dioxo-11β,17α-dihydroxy-21-acetoxy-pregnadiene which, for example, on subcutaneous administration of doses of 0.1 to 1.0 mg./kg. to the rat produces a distinct anti-inflammatory effect.

The compounds of the above Formula I are accessible in known manner; more especially, they are obtained when
(a) in a compound of the general formula (II)

in which $R_1$ represents a free, esterified or etherified hydroxyl group, $R_2$ the group group, X a hydrogen or fluorine atom and Y a hydrogen atom or a free or esterified hydroxyl group, chlorine is added on the 1,2-double bond and from the resulting 1,2-dichloro compound hydrogen chloride is eliminated; or
(b) in a compound of the general formula (III) 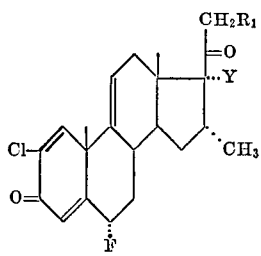

in which $R_1$ and Y have the same meaning as in Formula I, hypobromous acid is added onto the 9,11-double bond, from the resulting bromohydrin hydrogen bromide is eliminated by treatment with a basic agent and, if desired, in the resulting 9β,11β-oxido compound the 9β,11β-oxido group is split with hydrogen fluoride or a hydrogen fluoride donor; or (c) in a compound of the general formula (IV) 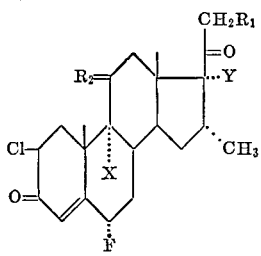

in which $R_1$, $R_2$, X and Y have the same meanings as in Formula I, a double bond is introduced into the 1,2-position in known manner; or (d) in a compound of the general formula (V) 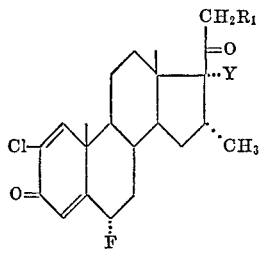

in which $R_1$ and Y have the same meanings as in Formula I, an 11β- or 11α-hydroxyl group is introduced in known manner and from the resulting 11β- or 11α-hydroxy compound water is eliminated, in the given case with formation of a 9,11-double bond, and, if desired, in a resulting compound, in known manner, free hydroxyl groups are esterified and/or the 21-hydroxyl group is etherified and/or esterified or etherified hydroxyl groups are converted into free hydroxyl groups.

The addition of chlorine onto the 1,2-double bond according to method (a) is carried out in known manner; for example, the chlorination is performed in an inert solvent, such as dioxane, in the presence of a carboxylic acid, for example propionic acid, at a low temperature in the dark. The elimination of hydrogen chloride from the 1,2-dichloro compounds is achieved by treatment with a base, preferably a tertiary organic nitrogen base, for example triethylamine, pyridine or collidine.

For the hypobromination according to method (b), for example, N-bromosuccinimide is used, preferably in the presence of perchloric acid. The dehydrobromination of the resulting bromohydrin to furnish the 9β,11β-oxido compound with a basic agent is advantageously carried out with an alkali metal acetate, for example sodium acetate, in an aliphatic alcohol, for example methanol or ethanol. The resulting 9β,11β-oxido group is split with hydrogen fluoride in the known manner, using anhydrous hydrogen fluoride, if desired in an inert solvent such as chloroform, tetrahydrofuran or especially dimethylformamide, or aqueous hydrofluoric acid. It is also possible to use hydrogen fluoride donors, for example the salts of this acid with a tertiary organic base, for example pyridine or a derivative of hydrofluoric acid. A particularly favourable process has been described in U.S.A. specification 3,211,758, where hydrofluoric acid in the form of an adduct with a carbamic acid or thiocarbamic acid, especially with urea, is used.

To introduce a double bond into a compound of the Formula IV by the method (c) a known chemical or microbiological dehydragenating method is used. From among the chemical methods there may be mentioned, for example, the dehydrogenation by means of selenium dioxide or selenious acid, preferably in a tertiary aliphatic alcohol such as tertiary butanol or tertiary amyl alcohol, or with 2,3-dichloro-5,6-dicyano-1,4-benzoquinone in boiling benzene or dioxan.

For the microbiological dehydrogenation there are used, for example, microorganisms of the species *Gorynebacterium simplex*, *Septomyxa affinis* or *Didymella lycopersici* or enzymes isolated therefrom and freed from the mycelium.

The introduction of a hydroxyl group in position 11β by method (d) is likewise performed microbiologically, using the microorganisms described in the literature, especially those of the genus Curvularia, for example *Curvularia lunata* or *Curvularia pallesceus*.

For introducing an 11α-hydroxyl group there are used, for example, microorganisms of the order Mucorales, especially of the family Mucoraceae, for example of the genus Rhizopus or Cunninghamella, especially *Rhizopus nicricans* or those of the genus Aspergillus, for example *Aspergillus niger* or *Aspergillus ochraceus*.

The dehydrating agent used in the manufacture of the compounds of the Formula III from the corresponding 11α- or 11β-hydroxy compounds saturated in the 9,11-position by elimination of water may be, for example, phosphorus oxychloride in pyridine, or an N-halogenamide or N-halogenimide, for example N-bromosuccinimide and sulphur dioxide under anhydrous conditions, preferably in pyridine.

If desired, the present invention includes the esterification of the free hydroxyl groups in positions 17 and 21. Both 17α- or 21-monoesters and 17α,21-diesters may be manufactured. To manufacture the 21-monoesters the 21-hydroxy compounds are treated in known manner with reactive functional carboxylic acid derivatives, preferably with those of the above-mentioned acids, for example with an acid anhydride or an acid halide, for instance in a tertiary base such as pyridine.

A free hydroxyl group in position 17α may be selectively esterified in known manner; for example: The 17α, 21-diester is prepared by acylation with a carboxylic acid anhydride, for instance acetic anhydride, with addition of a strong acid, especially an aromatic sulphonic acid, such as p-toluenesulphonic acid, as catalyst, and the 21-ester group is then hydrolyzed under mild conditions, using for instance a solution of an alkali metal carbonate or bicarbonate in an aqueous aliphatic alcohol, such as methanol or ethanol.

17α-monoesters are also accessible by the following known route: When a compound of the Formula I, that contains free hydroxyl groups in positions 17α and 21, is reacted with an orthoester of the type R'—C(OR")₃ (where R' represents a hydrogen atom or an alkyl radical and R" an alkyl radical) in the presence of a strong acid, for example p-toluenesulphonic acid, as catalyst in an inert solvent, for example benzene, a cyclic 17α,21-ortho-ester is obtained. By hydrolyzing with a weak organic acid, for example, oxalic acid, the 21-ester bond is then selectively hydrolyzed and 17α-monoester is obtained.

The present process includes, if desired, also the etherification of a free hydroxyl group in position 21 in known manner, preferably with a reactive derivative of one of the afore-mentioned alcohols. For example, by using dihydropyran in a solvent that is inert to the reaction, for example tetrahydrofuran, diethyl ether or chloroform, in the presence of phosphorus oxychloride, the 21-tetrahydropyranyl ether is obtained.

The compounds of the above Formulae II to V to be used as starting materials are known or can be prepared in known manner.

The invention includes also any variant of the process in which an intermediate obtained at any stage is used as starting material and any remaining step/steps is/are carried out or the process is discontinued at any stage thereof, or in which a starting material is formed under the reaction conditions.

The present invention is also concerned with the manufacture of pharmaceutical preparations for use in human and veterinary medicine containing the new pharmacologically active substances described above as active ingredients in conjunction or admixture with a pharmaceutical excipient. Suitable excipients are organic or inorganic substances suitable for enteral, for example oral, parenteral or local administration. Suitable excipients are substances that do not react with the new compounds, for example water, gelatin, lactose, starches, magnesium stearate, talcum, vegetable oils, benzyl alcohols, gums, polyalkyleneglycols, white petroleum jelly, cholesterol or other known medicinal excipients. The pharmaceutical preparations may be in solid form, for example tablets, dragees or capsules, or in liquid or semiliquid form, solutions, suspensions, emulsions, ointments or creams. These pharamceutical preparations may be sterilized and/or contain assistants such as preserving, stabilizing, wetting or emulsifying agents, salts for regulating the osmotic pressure or buffers. They may also contain further therapeutically valuable substances. The new compounds may also be used as starting materials for the manufacture of other valuable compounds.

The compounds of this invention may also be used as additives to animal fodders.

The following examples illustrate the invention.

EXAMPLE 1

30.0 grams of $\Delta^{1,4}$-6$\alpha$-fluoro-16$\alpha$-methyl-11$\beta$,17$\alpha$-dihydroxy - 21 - acetoxy - 3,20-dioxopregnadiene [paramethasone acetate] are dissolved in 1500 ml. of dioxane. The solution is cooled until dioxane begins to crystallize, then 150 ml. of a solution of 84 g. of chlorine in 1 litre of propionic acid are tipped in and the mixture is kept for 2 days at 0 to 5° C. in the dark. The reaction solution is then poured into 15 litres of water, extracted with 4×1 litre of methylenechloride and the extracts are washed successively with water, saturated aqueous sodium bicarbonate solution and once more with water. The washed, combined extracts are dried over sodium-sulphate, filtered and completely evaporated under vacuum at a bath temperature of 30 to 35° C., to yield 48.2 g. of $\Delta^4$-6$\alpha$-fluoro-1,2 - dichloro - 16$\alpha$ - methyl - 11$\beta$,17$\alpha$ - dihydroxy-21-acetoxy-3,20-dioxopregnene. $[\alpha]_D^{20}= +57°$ (c.=0.9% in dioxane). $\lambda_{max.}$ in reactified alcohol 250 m$\mu$ ($\epsilon$=10,500). The dichloride is instable and decomposes when left to itself at room temperature.

EXAMPLE 2

A solution of the resulting 48.2 g. of $\Delta^4$-6$\alpha$-fluoro-1,2-dichloro - 16$\alpha$ - methyl - 11$\beta$,17$\alpha$ - dihydroxy - 21 - acetoxy-3,20-dioxopregnene in ½ litre of pyridine is kept for 20 hours at room temperature, during which its colour gradually turns from pink to yellowish brown. The reaction solution is then poured into a mixture of 3 kg. of ice, 10 litres of water and 2 litres of concentrated hydrochloric acid. The whole is extracted with 5×1 litre of methylenechloride and the extracts are washed successively with water, saturated aqueous sodium bicarbonate solution and once more with water; the extracts are then combined, dried over sodium sulphate, filtered and completely evaporated under vacuum. For purification the residue is mixed with a small quantity of active carbon and recrystallized from methanol, to yield 21.0 g. of $\Delta^{1,4}$- 6$\alpha$ - fluoro - 2 - chloro - 16$\alpha$ - methyl - 11$\beta$,17$\alpha$ - dihydroxy-21-acetoxy-3,20-dioxopregnadiene melting at 232–233° C. $[\alpha]_D^{20}= +55°$ (c.=1% in dioxane. $\lambda_{max.}$ in ethanol 251 m$\mu$ ($\epsilon$=14,700).

The infrared spectrum (Nujol) displays absorption bands, inter alia, at 2.76, 2.86, 5.71, 5.77, 6.00, 6.09, 8.14, 9.41, 9.60, 9.92 and 10.87$\mu$.

EXAMPLE 3

While stirring a solution of 32.4 g. of $\Delta^{1,4}$-6$\alpha$-fluoro-2-chloro - 16$\alpha$ - methyl - 11$\beta$,17$\alpha$ - dihydroxy - 21 - acetoxy-3,20-dioxopregnadiene in 165 ml. of pyridine under nitrogen a solution of 17.1 g. of N-bromosuccinimide in 285 ml. of pyridine is run in within 10 minutes at 20 to 25° C. The brownish reaction solution is then cooled to −12° to −13° C. Then, while providing a permanent, successively increased cooling at −12° C. and finally at −20° C., within 50 to 70 minutes, a moderate current of sulphur dioxide is introduced until active bromine can no longer be detected in the reaction solution, and the introduction of sulphur dioxide is then continued for 15 to 20 minutes. The cooling is then discontinued and within 1½ to 2 hours a total of 2.25 litres of water is run into the brown, partially crystalline reaction mixture at first slowly and then more rapidly, during which the temperature gradually rises to 20 to 25° C. and the reaction product crystallizes out slowly from the solution which temporarily turns clear. The product is suctioned off, washed with 1 litre of water and dried under vacuum at 50 to 60° C. Yield: 29.1 g. of $\Delta^{1,4,9(11)}$-6$\alpha$-fluoro-2-chloro-16$\alpha$-methyl - 17$\alpha$ - hydroxy - 21 - acetoxy - 3,20 - dioxopregnatriene melting at 128 to 132° C. $[\alpha]_D^{20}= −8°$ (c.=1.0% in chloroform). $\lambda_{max.}$ in rectified alcohol 247 m$\mu$ ($\epsilon$=15,900).

EXAMPLE 4

While stirring a solution of 5.00 g. of $\Delta^{1,4,9(11)}$-2-chloro-6$\alpha$ - fluoro - 16$\alpha$ - methyl - 3,20 - dioxo - 11$\beta$,17$\alpha$ - dihydroxy-21-acetoxy-pregnatriene in 60 ml. of absolute dioxane and 7.5 ml. of 0.5 N-perchloric acid in the dark at 18 to 20° C., a solution of 2.34 g. of N-bromoacetamide in 40 ml. of absolute dioxane is dropped in within 15 minutes and the whole is then stirred for 4 hours under nitrogen in the dark at room temperature. Then, within 10 minutes, 15 ml. of 10% sodium thiosulphate solution (loss of colour) and then within 15 minutes 100 ml. of water are dropped in at 18 to 20° C. A solution of 1.5 g. of sodium hydroxide in 15 ml. of water and 10 ml. of methanol are added at about 20° C. and the reddish mixture is stirred for 1 hour under nitrogen at room temperature. At about 10° C., within 30 minutes, 400 ml. of water are dropped in; the precipitate is suctioned off, rinsed with water, dissolved in methylenechloride, the solution dried over sodium sulphate and evaporated to dryness under a water-jet vacuum. The yellow foam (4.64 g.) is sprinkled with ether and recrystallized from a mixture of methylenechloride+methanol+ether, to furnish 3.18 g. of pure $\Delta^{1,4}$-2-chloro-6$\alpha$-fluoro-16$\alpha$-methyl-9$\beta$,11$\beta$-oxido-3,20-dioxo - 17$\alpha$,21 - dihydroxypregnadiene melting at 200 to 202° C. $[\alpha]_D^{20}= −10°±1°$ (c.=0.964). Ultraviolet spectrum: $\lambda_{max.}$ 254 m$\mu$ ($\epsilon$=15,500).

Infrared spectrum, bands, inter alia, at 2.77, 2.85, 5.84, 5.97, 6.03, 6.20, 8.80, 9.37, 9.90, 10.10, 10.95 and 11.87$\mu$.

EXAMPLE 5

A solution of 1.80 grams of $\Delta^{1,4}$-2-chloro-6$\alpha$-fluoro-16$\alpha$ - methyl - 9$\beta$,11$\beta$ - oxido - 3,20 - dioxo - 17$\alpha$,21-dihydroxypregnadiene in 10 ml. of pyridine and 10 ml. of acetic anhydride is kept for 15 hours at room temperature. The clear, yellow solution is poured into ice water and stirred for 30 minutes, and then extracted twice with chloroform. The organic phases are successively washed with water, dilute sulphuric acid/ice, water, saturated sodium bicarbonate solution/ice and with water until the washings run neutral, dried over sodium sulphate and evaporated to dryness under a water-jet vacuum. The resulting yellowish oil (1.89 g.) is sprinkled with ether and redissolved once from methylenechloride+ether, to yield 1.23 g. of pure 21-acetate of the above starting material, melting at 184° C. Ultraviolet spectrum: $\lambda_{max.}=254$ m$\mu$ ($\epsilon=15,400$) [in ethanol]. $[\alpha]_D^{20}=+5°\pm2°$ (c. =0.580 in chloroform). Infrared spectrum, bands, inter alia, at 2.75, 5.70, 5.75, 5.96, 6.18, 7.25, 8.12, 9.40, 9.93 and 10.95$\mu$.

EXAMPLE 6

2.62 grams of the acetate obtained in Example 5 are introduced into a polyethylene vessel containing 60 ml. of urea-hydrogen fluoride adduct (1:1.325) and stirred for 40 hours with exclusion of air by means of a Teflon magnetic stirrer at 3° C. ($\pm1°$ C.). The suspension is stirred into a mixture of 700 g. of ice and 200 ml. of concentrated ammonia and then adjusted with glacial acetic acid to pH 7. The precipitate is suctioned off, rinsed with water, dissolved in chloroform, the solution is dried over sodium sulphate and evaporated to dryness under a water-jet vacuum. The resulting brown crystals (about 2.8 g.) are dissolved in a 4:1-mixture of toluene and ethyl acetate and filtered through 120 g. of silica gel. The fractions which crystallize in a gelatinous form are dissolved with heating in methylenechloride, concentrated under atmospheric pressure and a small quantity of ether is added, to yield 1.06 g. of pure $\Delta^{1,4}$-2-chloro-6$\alpha$,9$\alpha$-difluoro-16$\alpha$-methyl-3,20-dioxo - 11$\beta$,17$\alpha$ - dihydroxy-21-acetoxypregnadiene melting at (202°) 204° C. According to thin-layer chromatography the mother liquor likewise contains 95% of this product. $[\alpha]_D^{20}=+48°\pm2°$ (c.=0.497). Ultraviolet spectrum: $\lambda_{max.}=246$ m$\mu$ ($\epsilon=15,800$). Infrared spectrum (Nujol) bands, inter alia, at 2.82, 5.70, 5.76, 6.15, 7.83, 8.74, 9.37, 9.91, 10.50, 10.95 and 11.25$\mu$.

EXAMPLE 7

9.4 g. of $\Delta^{1,4}$-6$\alpha$-fluoro-2-chloro-16$\alpha$-methyl-11$\beta$,17$\alpha$-dihydroxy-21-acetoxy-3,20-dioxopregnadiene are dissolved in 400 ml. of methanol by heating to the boil while introducing nitrogen. The resulting solution is cooled under nitrogen to 1–3° C. and, within 15–30 minutes, a solution of 1.7 g. of sodium bicarbonate in 50 ml. of water is added dropwise. Stirring of the reaction solution is continued overnight at 1–3° C. under nitrogen, the reaction product crystallizing out gradually. The course of hydrolysis is observed by means of thin layer chromatography on silica gel using toluene+ethyl acetate 1:1 as running agent. After 10–15 hours' saponification it is no longer possible to detect any starting material in the reaction solution. The mixture is then poured into 2 litres of water. There follow several extractions with methylene chloride, and the extracts are washed repeatedly with water and dried over sodium sulfate, filtered and evaporated completely. A yield of 7.65 g. of crystalline crude product melting at 175° C. is obtained. The product is pure according to thin-layer chromatography (silica gel, toluene+ ethyl acetate 1:1). For further purification, the crude product which has a slight yellow tint is crystallized from ethyl acetate, and 2.87 g. of $\Delta^{1,4}$-6$\alpha$-fluoro-2-chloro-16$\alpha$-methyl-11$\beta$,17$\alpha$,21-trihydroxy - 3,20-dioxo-pregnadiene of melting point (180° C.) 181–182° C. are obtained.

On concentration of the mother liquor further quantities of the same product are obtained.

EXAMPLE 8

9.0 grams of $\Delta^{1,4}$-6$\alpha$,9$\alpha$-difluoro-16$\alpha$-methyl-11$\beta$,17$\alpha$-dihydroxy-21-acetoxy - 3,20 - dioxopregnadiene (flumethasone acetate) are dissolved in 750 ml. of pure dioxan with the application of heat. After cooling until crystallization of the dioxan sets in, 66 ml. of a solution of 36 g. of chlorine in 500 ml. of pure propionic acid are added all at once and the whole is allowed to stand in the dark at 0–5° C. for 7 days. The reaction solution is poured into 3 litres of iced water. The batch is extracted with 3× 500 ml. of methylene chloride and the extracts washed successively with water, saturated aqueous sodium bicarbonate solution, and water. The extracts are then combined and dried over sodium sulfate, filtered, evaporated completely under reduced pressure at a bath temperature of 30–35° C. There are obtained 11.7 g. of $\Delta^4$-6$\alpha$,9$\alpha$-difluoro,1,2-dichloro-16$\alpha$-methyl - 11$\beta$,17$\alpha$ - dihydroxy-21-acetoxy-3,20-dioxo-pregnene. The IR spectrum (methylene chloride) exhibits absorption bands inter alia at 2.80, 3.95, 5.75, 5.95, 7.25, 8.20, 8.85, 9.45, 9.60, 10.05 and 11.35$\mu$.

The dichloride is unstable and decomposes when allowed to stand at room temperature.

11.7 g. of $\Delta^4$-6$\alpha$,9$\alpha$-difluoro-1,2-dichloro-16$\alpha$-methyl-11$\beta$,17$\alpha$-dihydroxy-21-acetoxy-3,20-dioxopregnene are dissolved in 150 ml. of pure pyridine and the solution allowed to stand at room temperature for 24 hours, when the color gradually changes from pink to yellow to brown. The reaction solution is then poured into 1 litre of ice-cooled normal hydrochloric acid. The batch is then extracted with 5× 250 ml. of methylene chloride and the extracts are washed successively and repeatedly with ice-cooled, normal hydrochloric acid, water, ice-cooled, saturated sodium bicarbonate solution, and water. The extracts are then combined and dried over sodium sulfate, filtered, and completely evaporated under reduced pressure. The resulting, partly crystalline crude product (10 g.) is chromatographed on 750 g. of silica gel (diameter of column, 6 cm.), elution being performed with toluene+ethyl acetate 95:5, then 90:10, and finally 80:20. From the first runnings (fractions 69–80) there is obtained on concentration, 0.7 g. of $\Delta^{1,4}$-6$\alpha$,9$\alpha$-difluoro-2-chloro-16$\alpha$-methyl-17$\alpha$-hydroxy - 11$\beta$,21 - diacetoxy-3,20-dioxo-pregnadiene of melting point (240° C.) 246–250° C.; $[\alpha]_D^{20°}+90°$ (c.=1% in dioxan) and $\lambda_{max.}$ (rectified alcohol) 245 m$\mu$ ($\epsilon=14,600$). The fractions 86–115 are jointly evaporated completely and the residue recrystallized from rectified alcohol to obtain 2.4 g. of $\Delta^{1,4}$-6$\alpha$,9$\alpha$-difluoro-2-chloro-16$\alpha$-methyl - 11$\beta$,17$\alpha$ - dihydroxy-21-acetoxy-3,20-dioxo-pregnadiene which melts between 200 and 210° C.; $[\alpha]_D^{20°}+61°$ (c.=1% in dioxane and $\lambda_{max.}$ (rectified alcohol) 246 m$\mu$ ($\epsilon=16,100$). When the mother liquors are concentrated, further quantities of the same compound are obtained.

EXAMPLE 9

18.0 grams of $\Delta^{1,4}$-6$\alpha$,9$\alpha$-difluoro-16$\alpha$-methyl-11$\beta$,17$\alpha$-dihydroxy - 21 - trimethylacetoxy-3,20-dioxo-pregnadiene are dissolved in 1500 ml. of pure dioxan. The solution is cooled until crystallization of the dioxan sets in, and then 90 ml. of a solution of 72 g. of chlorine in 1000 ml. of propionic acid are added all at once, and the whole allowed to stand in the dark at 0–5° C. for 7 days. The batch is worked up as described in Example 1, and 22.7 g. of $\Delta^4$ - 6$\alpha$,9$\alpha$-difluoro-1,2-dichloro-16$\alpha$-methyl-11$\beta$,17$\alpha$-dihydroxy - 21 - trimethylacetoxy-3,20-dioxo-pregnene obtained which melt at 200° C. with decomposition.

The 22.7 g. of this product are covered with 300 ml. of pure, dry pyridine, a clear, pale-brown solution forming immediately. The solution is allowed to stand at room temperature for 2 days and then worked up as described in Example 2. The resulting brownish, crystalline crude product (20.9 g.) is chromatographed on 2300 g. of silica gel (diameter of column, 12 cm.) with toluene+ethyl acetate 95:5. The first runnings are separated (fractions 10–25), and the fractions 38–61 then evaporated and the residue recrystallized from ethyl acetate. There are obtained 4.68 g. of $\Delta^{1,4}$ - 6$\alpha$,9$\alpha$ - difluoro - 2-chloro-16$\alpha$-methyl-11$\beta$,17$\alpha$ - dihydroxy - 21 - trimethylacetoxy-3,20-dioxopregnadiene of melting point (242° C.) 243–244° C.; $[\alpha]_D20°$ +58° (c.=0.8% in dioxan) and $\lambda_{max.}$ (rectified alcohol) 247 m$\mu$ ($\epsilon=16,200$). When the mother liquor is concentrated, further quantities of utilizable material are obtained.

EXAMPLE 10

Pharmaceutical preparation in the form of an ointment for local administration, containing $\Delta^{1,4}$-2-chloro-$6\alpha,9\alpha$-difluoro - $16\alpha$ - methyl - 3,20-dioxo-$11\beta,17\alpha$-dihydroxy-21-acetoxypregnadiene, consisting of:

|  | Percent |
|---|---|
| White petroleum jelly (petrolatum) | 65 |
| Higher aliphatic alcohols (waxes) | 10 |
| Polyoxyethylene-sorbitan derivative (sorbitan-fatty acid ester) | 4.6 |
| Preservative | 0.2 |
| Perfume | 0.1 |
| Water | 20 |
| $\Delta^{1,4}$ - 2 - chloro - $6\alpha,9\alpha$ - difluoro-$16\alpha$-methyl-3,20-dioxo-$11\beta,17\alpha$-dihydroxy-21-acetoxypregnadiene | 0.1 |

The fats and emulsifiers are fused together, the preservatives dissolved in water and the solution is emulsified in the fat melt at an elevated temperature. After cooling, a suspension of the active ingredient in part of the fat melt is worked into the emulsion and then the perfume is added.

We claim:

1. A compound of the general formula (I) 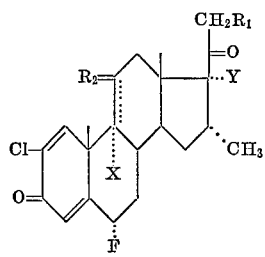

in which $R_1$ represents a free, esterified or etherified hydroxyl group, $R_2$ the group

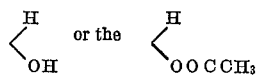

group, X a hydrogen or fluorine atom or $R_2+X$ represents a 9,11-double bond or a $9\beta,11\beta$-oxido group and Y represents a free or esterified hydroxyl group, each of said esterified hydroxyl groups being derived from a carboxylic acid having 1 to 18 carbon atoms and each of said etherified hydroxyl groups being derived from alcohols having 1 to 8 carbon atoms.

2. A compound of the formula as claimed in claim 1, wherein $R_1$ is a hydroxy group esterified with a carboxylic acid having 1 to 18 carbon atoms, $R_2$ and Y represent each a hydroxy group and X stands for hydrogen or fluorine.

3. A compound of the formula as claimed in claim 1, wherein $R_1$ is an acetoxy group, $R_2$ and Y represent each a hydroxy group and X stands for hydrogen or fluorine.

4. A compound of the formula as claimed in claim 1, wherein $R_1$ is a hydroxy group esterified with a carboxylic acid having 1 to 18 carbon atoms, Y represents a hydroxy group and $R_2$ together with X stand for the 9,11 double bond or a $9\beta,11\beta$-oxido group.

5. A compound of the formula as claimed in claim 1, wherein $R_1$ is the acetoxy group, Y represents a hydroxy group and $R_2$ together with X stand for the 9,11-double bond or a $9\beta,11\beta$-oxido group.

6. A compound as claimed in claim 1 and being $\Delta^{1,4}$-2-chloro - $6\alpha$ - fluoro - $16\alpha$-methyl-$11\beta,17\alpha,21$-trihydroxy-3,20-dioxo-pregnadiene.

7. A compound as claimed in claim 1 and being $\Delta^{1,4}$-2-chloro - $6\alpha$ - fluoro - $16\alpha$-methyl-$11\beta,17\alpha,21$-trihydroxy-3,20-dioxo-pregnadiene-21-acetate.

8. A compound as claimed in claim 1 and being $\Delta^{1,4,9(11)}$ - 2 - chloro-$6\alpha$-fluoro-$16\alpha$-methyl-$17\alpha$-hydroxy-21-acetoxy-3,20-dioxo-pregnatriene.

9. A compound as claimed in claim 1 and being $\Delta^{1,4}$-2-chloro - $6\alpha$ - fluoro-$16\alpha$-methyl-$9,11\beta$-oxido-$17\alpha$-hydroxy-21-acetoxy-3,20-dioxo-pregnadiene.

10. A compound as claimed in claim 1 and being $\Delta^{1,4}$-2 - chloro - $6\alpha,9\alpha$ - difluoro-$16\alpha$-methyl-$11\beta,17\alpha,21$-trihydroxy-3,20-dioxo-pregnadiene.

11. A compound as claimed in claim 1 and being $\Delta^{1,4}$-2 - chloro - $6\alpha,9\alpha$-difluoro-$16\alpha$-methyl-$11\beta,17\alpha$-dihydroxy-21-acetoxy-3,20-dioxo-pregnadiene.

12. A compound as claimed in claim 1 and being $\Delta^{1,4}$-2 - chloro - $6\alpha,9\alpha$ - difluoro-$16\alpha$-methyl-$11\beta,17\alpha$-dihydroxy-21-trimethylacetoxy-3,20-dioxo-pregnadiene.

References Cited

UNITED STATES PATENTS

| 2,865,936 | 12/1950 | Schneider et al. | 260—397.45 |
| 3,499,016 | 3/1970 | Lincoln et al. | 260—397.45 |
| 3,152,154 | 10/1964 | Ercoli et al. | 260—397.45 |
| 3,232,835 | 2/1966 | Figdor et al. | 167—65 |

FOREIGN PATENTS

| 837,107 | 8/1960 | France | 260—397.45 |
| 836,531 | 8/1960 | France | 260—397.45 |
| 837,260 | 8/1960 | France | 260—397.45 |
| 106,332 | 10/1963 | Netherlands | 260—397.45 |
| 1,150,385 | 5/1967 | Germany. |  |

ELBERT L. ROBERTS, Primary Examiner

U.S. Cl. X.R.

260—397.45; 424—243; 195—51

UNITED STATES PATENT OFFICE
CERTIFICATE OF CORRECTION

Patent No. 3,652,554     Dated March 28, 1972

Inventor(s) Anner et al

It is certified that error appears in the above-identified patent and that said Letters Patent are hereby corrected as shown below:

Column 9, the upper right-hand portion of formula (I) should read:

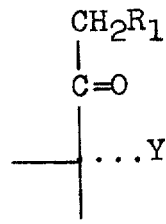

Signed and sealed this 30th day of January 1973.

(SEAL)
Attest:

EDWARD M. FLETCHER, JR.
Attesting Officer

ROBERT GOTTSCHALK
Commissioner of Patents